United States Patent [19]

Cretzler

[11] Patent Number: 5,393,103
[45] Date of Patent: Feb. 28, 1995

[54] METHOD AND COUPLER FOR JOINING CONDUITS AND A METHOD OF MAKING THE COUPLER

[76] Inventor: Donald J. Cretzler, 3712 Del Mar Ave., San Diego, Calif. 92106

[21] Appl. No.: 130,753

[22] Filed: Oct. 4, 1993

[51] Int. Cl.⁶ .............................................. F16L 21/00
[52] U.S. Cl. ............................... 285/31; 285/93; 285/332; 285/369; 285/383; 285/423; 285/915; 156/98; 156/294
[58] Field of Search ............... 285/31, 93, 423, 369, 285/383, 417, 915, 332; 29/446; 156/98, 294

[56] References Cited

U.S. PATENT DOCUMENTS

| | | | |
|---|---|---|---|
| 3,826,521 | 7/1974 | Wilhelmsen | 285/31 X |
| 4,013,309 | 3/1977 | Quick | 285/31 |
| 4,035,002 | 7/1977 | Curtin | 285/31 |
| 4,186,475 | 2/1980 | Jonsson | 285/31 X |
| 4,521,037 | 6/1985 | Knox | 285/31 X |
| 4,687,232 | 8/1987 | Zimmerman | 285/31 |
| 4,810,006 | 3/1989 | Brodie | 285/31 |

FOREIGN PATENT DOCUMENTS

| | | | |
|---|---|---|---|
| 534920 | 12/1956 | Canada | 285/31 |
| 1128607 | 1/1957 | France | 285/31 |
| 125526 | 9/1979 | Japan | 285/31 |

Primary Examiner—Dave W. Arola
Attorney, Agent, or Firm—Bernard L. Kleinke; Jerry R. Potts; Peter P. Scott

[57] ABSTRACT

A method of joining conduits includes using a coupler, which includes a pliable tubing and a pair of end sleeves. The coupler is attached to the ends of a pair of conduits by flexing the tubing to cause the coupler to flex into proper alignment and connection with the conduits.

12 Claims, 1 Drawing Sheet

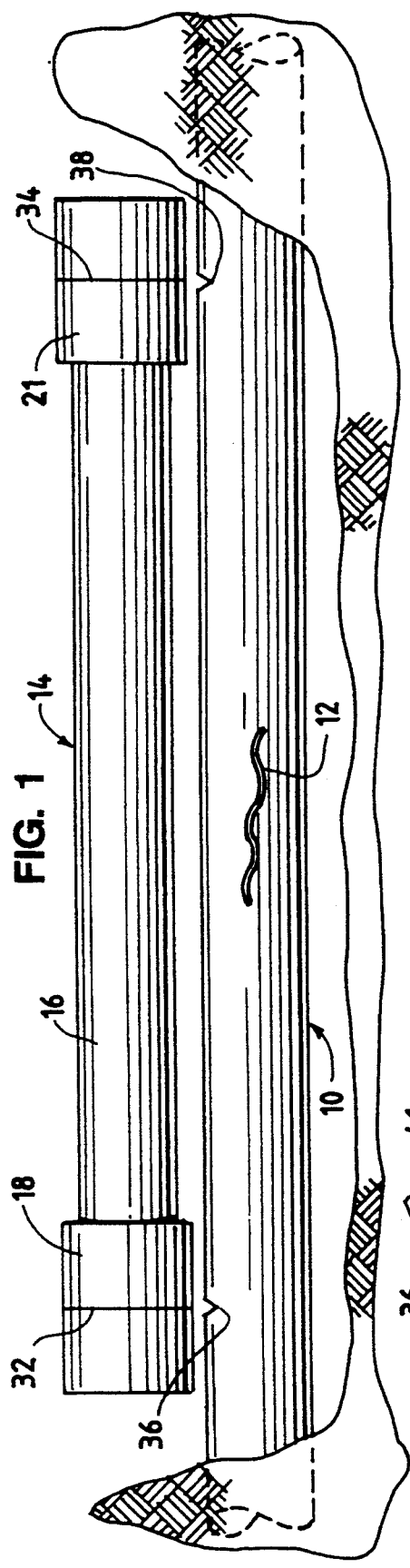
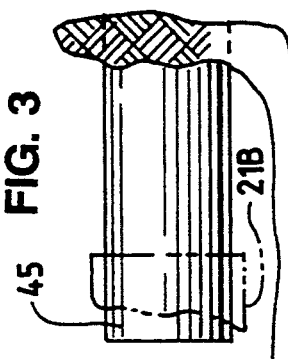
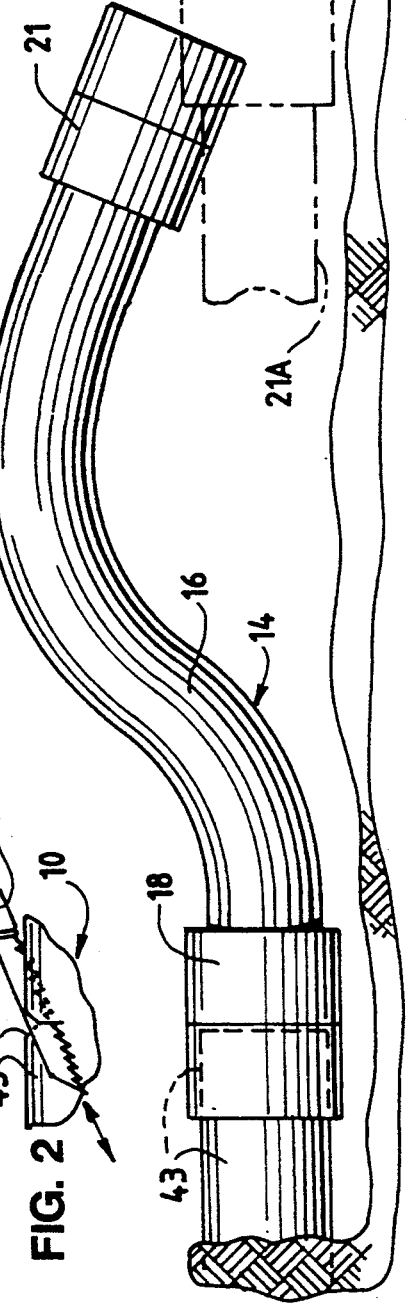
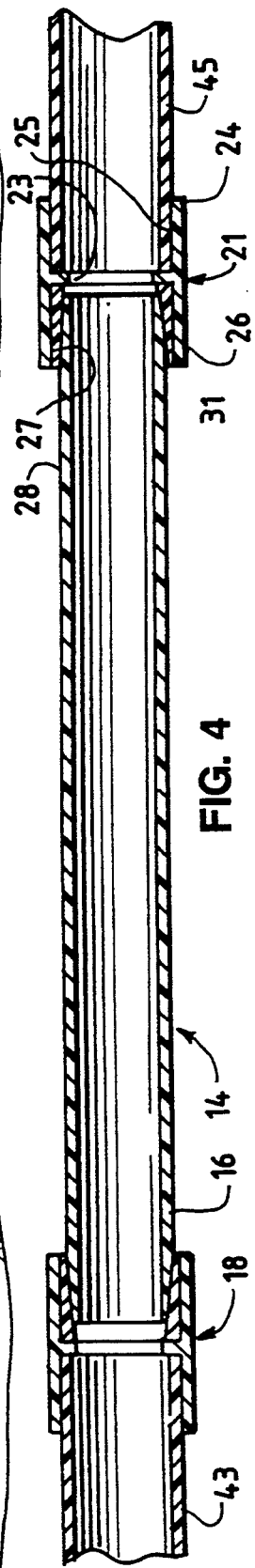

METHOD AND COUPLER FOR JOINING CONDUITS AND A METHOD OF MAKING THE COUPLER

TECHNICAL FIELD

The present invention relates in general to a method and coupler for joining conduits, and a method of making the coupler. The present invention relates in particular to a method and coupler for repairing a conduit.

BACKGROUND ART

Modernly, plastic pipes are employed for many applications, and can be composed of a variety of plastic materials, such as polyvinylchloride. The advantage of using such plastic pipes, includes low cost, and ease in assembling and installing such plastic piping drainage and irrigation systems.

One type of plastic piping system is used frequently for soil irrigation purposes. In this regard, plastic pipes are used in the ground to supply water to sprinkler systems for irrigation purposes.

One problem frequently encountered with such plastic pipe irrigation systems is that the plastic pipe can fracture or otherwise rupture in the ground, thereby causing a serious leak and loss of pressure in the system. In order to repair the pipe, the soil must be removed to expose the broken pipe so that it can be repaired.

The difficulty in repairing such a pipe goes beyond the digging down into the ground and removing the soil, since the broken portion of the pipe must be removed by cutting off the damaged section, and then a coupler is used to replace the removed section of the pipe. There is a serious problem in attempting to manipulate the coupler into position in the ground, to join the cut-off ends of the pipes.

The problem frequently encountered in the repair operation is that one end of the coupler is first attached, then the other end must somehow be manipulated into position to slip onto the other cut-off end. In order to accomplish such an awkward manipulation, the other cut-off end must also be partially unburied and lifted up to receive the other end of the coupler. In so doing, that portion of the pipe may also become broken as a result of being unearthed and pulled up to permit access to the coupler. Also, to attach the coupler, both cut-off ends must be raised angularly upwardly out of alignment with one another to somehow receive the coupler and then the coupler is lowered downwardly until the coupler is in proper alignment with the two cut-off ends of the pipe. Such an operation is very awkward to perform, and oftentimes results in further breakage of the pipes.

A further problem is encountered when a person must make a decision as to how much of the broken pipe to remove. If too little of the pipe is removed, then it is almost impossible to install the coupler in place. If too much of the pipe is removed, the cut-off ends must be properly seated within the ends of the coupler to provide a proper sealingly engaged fit.

Therefore, it would be highly desirable to have a new and improved method and coupler for repairing broken pipes, and otherwise to join conduits in fluid communication in a convenient manner.

DISCLOSURE OF INVENTION

Therefore, it is the principal object of the present invention to provide a new and improved method and coupler for joining conduits in fluid communication.

Another object of the present invention is to provide a new and improved method and coupler for repairing conduits.

Briefly, the above and further objects of the present invention are realized by providing a flexible conduit, which enables a person to manipulate the conduit into proper position for joining a pair of conduits in fluid communication.

A method of joining conduits includes using a coupler, which includes a pliable tubing and a pair of end sleeves. The coupler is attached to the ends of a pair of conduits by flexing the tubing to cause the coupler to flex into proper alignment and connection with the conduits.

BRIEF DESCRIPTION OF DRAWINGS

The above mentioned and other objects and features of this invention and the manner of attaining them will become apparent, and the invention itself will be best understood by reference to the following description of an embodiment of the invention in conjunction with the accompanying drawings, wherein:

FIG. 1 is an elevational view of a coupler, which is constructed in accordance with the present invention, and which is illustrated in an initial portion of a method of repairing a partially unearthed broken conduit in accordance with the present invention;

FIG. 2 is a partially broken away elevational view of a subsequent step in the repair method of FIG. 1;

FIG. 3 is a later step of the repair method of FIG. 1; and

FIG. 4 is a final step of the repair method of FIG. 1, illustrating the coupler in an axial sectional view, illustrating it joining a pair of conduits to complete the repair.

BEST MODE FOR CARRYING OUT THE INVENTION

Referring now to the drawings, and more particularly to FIGS. 1–4 thereof, there is shown a method for repairing a pipe 10 having a rupture or break 12, in accordance with the principals of the present invention.

In this regard, the present method enables the pipe 10 to be repaired in a convenient and effective manner. However, it is to be understood that the novel coupler 14 may also be used for other applications for joining two separate unbroken conduits (not shown).

The coupler 14 includes a reliable tubing 16, and a pair of end sleeves 18 and 21, which are connected sealingly to the opposite ends of the tubing 16 for the attachment to a pair of conduits, such as a pair of cut-off ends of the pipe 10 as formed in accordance with the present invention and as hereinafter described in greater detail.

The end sleeves each similar to one another, and only the sleeve 21 will now be described in greater detail. The sleeve 21 has an internal annular shoulder 23 for dividing the tubular sleeve 21 into a pair of end portions 24 and 26, which are of substantially equal axial length. The end portion 24 is adapted to receive a conduit, such as the cut-off end 45 of the pipe 10, and the end 26 is connected to an end 28 of the tubing 16 in a liquid-tight manner. The pliable tubing 16 helps the manipulation of the coupler 14 to help connect a pair of conduits together in fluid communication.

The sleeve 21 includes a smooth annular inner surface 25 for receiving in a friction tight manner a cut-off end 45 of the pipe 10 so that the sleeve 21 can be sealed in a liquid-tight manner thereto. Similarly, at the opposite end 26 there is a smooth annular inner surface 27 which receives in a secured tube an inner pressure sleeve 29, which in turn is fixed in a high pressure sealing engagement with the end 28 of the tubing 14. The inner sleeve 29 and the outer sleeve 21 bonded fixedly and sealingly together by a suitable solvent or adhesive. The inner sleeve 29 includes an inner tubular wall 30 and an internal tapered annular surface 31 for securing the received end 28 of the tubing 14 in a radially inwardly compressed manner to seal in a high-pressure manner the tubing 14 and the sleeve end 26 together. The tapered surface 31 is narrowed as it extends axially inwardly.

In accordance with the present invention, the novel repairing or joining method includes using a coupler 14 by positioning it in a generally rectilinear manner above the pipe 10 to be repaired opposite the rupture or leak 12 as illustrated in FIG. 1. A pair of indicia 32 and 34 are disposed on the outer surfaces of the end sleeves 18 and 21 at a midpoint thereon to help identify where a pair of saw cuts can be made in the pipe 10 to remove the broken section of the pipe 10. In this regard, the coupler 14 is positioned in a central manner relative to the rupture 12, and a pair of saw cuts or notches 36 and 38 are made opposite the respective indicia 32 and 34 to determine the length of the section of the pipe 10 to be removed.

As shown in FIG. 2, the pipe 10 is first cut at the notch 36 with a saw 41 or suitable tool to form a cut-off end 43 of the pipe 10. Similarly, the tool 41 is used to cut off the pipe 10 at the notch 38 to form the cut-off end 45 shown in FIGS. 3 and 4 of the drawings.

As shown in FIG. 3, the sleeve 18 is attached sealingly to the cut-off end 43 by a suitable solvent or adhesive (not shown) to bond the sleeve 18 to the cut-off end 43.

Thereafter, the tubing 14 is flexed to position the free sleeve 21 generally in a desired position for engagement with the cut-off end 45 of the pipe, as indicated in solid lines in FIG. 3. Thereafter, as indicated at 47, manual force is applied to the upper portion of the tubing 16 to move it downwardly to cause the tubing to flex still further to move the sleeve 45 into an axially aligned position relative to the end of the cut-off end 45, as indicated in broken lines at 21A.

By subsequently moving the pliable tubing 16 to cause the sleeve 21 to slide forcibly telescopically relative to the cut-off end 45 to seat the sleeve 21 in place thereon, as indicated in broken lines at 21B. In that position, the sleeve 45 is bonded in position by a solvent or adhesive (not shown). The final positioning of the coupler is shown in FIG. 4.

The tubing 16 can be composed of various different thermoplastic and thermal setting materials, such as polyvinylchloride. Similarly, the inner and outer sleeves are composed of rigid plastic material, such as a suitable thermoplastic material, such as polyvinylchloride.

While a particular embodiment of the present invention has been disclosed, it is to be understood that various different modifications are possible and are contemplated within the true spirit and scope of the appended claims. There is no intention, therefore, of limitations to the exact abstract or disclosure herein presented.

What is claimed is:

1. A method of repairing a ruptured conduit, comprising:
   removing the ruptured section of the conduit to form a pair of cut-off ends;
   using a coupler having a pliable tubing portion for facilitating the manipulation of the coupler into position relative to the cut-off ends of the conduit, and having a pair of end sleeves fixed to opposite ends of the tubing portion for receiving the cut-off ends to connect them in fluid communication with one another through the coupler, wherein said opposite ends are received within said sleeves, and wherein said tubing portion has a wall thickness sufficient to permit said tubing portion to be flexed for manipulating it, and not readily manually deformable to resist collapsing thereby substantially maintaining the cross-sectional area of the tubing portion during its manipulation;
   inserting one of the cut-off ends within one of said end sleeves until the cut-off end abuts an inner annular shoulder connected to an interior surface of said end sleeve;
   flexing the tubing portion to cause the other end sleeve to move into engagement with the other cut-off end to be in general position for attachment thereto;
   subsequently flexing the tubing portion still further for causing the other end sleeve to move into axial alignment with the other cut-off end to facilitate the connection thereto; and
   subsequently moving the flexible portion to cause the other end sleeve to forcibly telescopically slide relative to the other cut-off end until the other end sleeve moves relative thereto into a final connected position in fluid communication therewith, wherein the other cut-off end is received within said other end sleeve and substantially abuts another inner annular shoulder connected to another interior surface of said other end sleeve.

2. A method according to claim 1, further including affixing the end-sleeves to their respective cut-off conduit end by a suitable adhesive.

3. A method according to claim 1, wherein the end sleeves include external indicia thereon to help facilitate the removing of a sufficient length of the broken conduit;
   initially positioning the coupler in a parallel, rectilinear position relative to the broken conduit in a centrally disposed manner relative to the ruptured portion of the conduit; and
   marking the conduit on opposite sides of the rupture thereof opposite to the indicia on the pair of end sleeves.

4. A method according to claim 3, cutting the ruptured conduit at the marks on the conduit to form the pair of cut-off ends.

5. A method of making a conduit coupler, comprising:
   using a pliable tubular portion adapted to facilitate the manipulation of the coupler between the ends of a pair of conduits to be coupled, wherein said tubing portion has a wall thickness sufficient to permit said tubing portion to be flexed for manipulating it, and not readily manually deformable to resist collapsing thereby substantially maintaining the cross-sectional area of the tubing portion during its manipulation;

using a pair of end sleeves each having end portions with internal tapered compression fittings for securely receiving the tubular portion ends and having opposite ends for receiving conduit ends in a friction tight manner;

forcing the pliable tubing ends into the compression fittings of the pair of end sleeves to fix them in a liquid tight communication therewith.

6. A method according to claim 5, wherein the step of attaching the pliable tubing to the compression fittings of the end sleeves includes using separate compression sleeves, forcing the compression sleeves onto the ends of the pliable tubing, and then attaching the compression sleeves to the end sleeves for securing therewithin.

7. A method of joining a pair of conduits, comprising;

using a coupler for connecting the conduits in fluid communication, said coupler having a flexible tubular portion for helping the manipulation of the coupler to help connect the conduits together in fluid communication and having a pair of end conduit receiving sleeves for attachment to the conduits, said tubing portion having a wall thickness sufficient to permit said tubing portion to be flexed for manipulating it, and not readily manually deformable to resist collapsing thereby substantially maintaining the cross-sectional area of the tubing portion during its manipulation;

inserting one of the conduits within one of said sleeves until the conduit abuts an inner annular shoulder connected to an interior surface of said sleeve;

flexing the portion to position the other sleeve generally in a desired position for engagement with the end of the other conduit;

subsequently flexing the flexible portion still further to move the other sleeve into an axially aligned position relative to the end of the other conduit;

subsequently moving the flexible portion to slide forcibly the other sleeve telescopically relative to the other conduit to seat the other sleeve in place thereon, wherein the other conduit is received within said other sleeve and substantially abuts another inner annular shoulder connected to another interior surface of said other sleeve.

8. A coupler for joining a pair of conduits, comprising:

pliable tubing portion for helping the manipulation of the coupler to help connect the conduits together in fluid communication, said tubing portion having a wall thickness sufficient to permit said tubing portion to be flexed for manipulation of the tubing portion and not readily manually deformable to substantially maintain the cross-sectional area of said tubing portion during its manipulation;

a pair of conduit receiving sleeves connected sealingly to the opposite ends of said tubing portion for attachment to the ends of the conduits;

each one of said sleeves having an end portion including a tubular wall having an internal annular smooth surface for receiving and engaging a conduit in a friction tight manner;

said one of said sleeves having an opposite end portion receiving and securing therein one end of the tubing portion in a high pressure connection manner; and said opposite end portion including a tubular wall having a tapered annular surface means for securing the received end of the tubing in a radially inwardly compressed manner to seal in a high pressure manner the tubing portion and said opposite end portion together.

9. A coupler for joining a pair of conduits, comprising:

pliable tubing portion for helping the manipulation of the coupler to help connect the conduits together in fluid communication said tubing portion having a wall thickness sufficient to permit said tubing portion to be flexed for manipulating it, and not readily manually deformable to resist collapsing thereby substantially maintaining the cross-sectional area of the tubing portion during its manipulation;

a pair of conduit receiving sleeves connected sealingly to the opposite ends of said tubing portion for attachment to the ends of the conduits;

each one of said sleeves having an end portion including a tubular wall having an internal annular smooth surface for receiving and engaging a conduit in a friction tight manner;

each one of said sleeves having an opposite end portion means for receiving and securing therein one end of the tubing portion in a sealed manner; and each one of said sleeves further having an internal annular shoulder to divide said sleeves into said end portion and said opposite end portion for facilitating a liquid tight connection between said sleeves and said tube portion and the conduit ends.

10. A coupler according to claim 9, wherein said opposite end portion means includes a tubular wall having an internal tapered angular surface for securing the received end of the tubing in a radially inwardly compressed manner to seal in a high pressure manner the tubing portion and said opposite end portion together, said tapered surface being narrowed as it extends axially inwardly.

11. A coupler according to claim 10, wherein said opposite end portion means further includes another internal annular smooth surface, and said internal tapered annular surface is formed on an inner compression sleeve fixed to said opposite end portion smooth surface.

12. A coupler according to claim 9, further including means defining indicia on the outer surface of the pair of end sleeves at about a midpoint thereof to facilitate the marking of the ruptured pipe on opposite sides of the rupture therein to help identify where to remove the ruptured portion thereof to form the pair of cut-off ends, wherein said indicia means represents the approximate location of said internal annular shoulder.

* * * * *